United States Patent
Thimmareddy et al.

(10) Patent No.: US 12,177,224 B2
(45) Date of Patent: Dec. 24, 2024

(54) ALERTING ON ANOMALOUS AUTHORIZATION REQUESTS DERIVED WITH PROXIMITY GRAPH

(71) Applicant: Bank of America Corporation, Charlotte, NC (US)

(72) Inventors: Arjun Thimmareddy, Charlotte, NC (US); Aarron Gull, East Northport, NY (US)

(73) Assignee: Bank of America Corporation, Charlotte, NC (US)

( * ) Notice: Subject to any disclaimer, the term of this patent is extended or adjusted under 35 U.S.C. 154(b) by 199 days.

(21) Appl. No.: 18/050,250

(22) Filed: Oct. 27, 2022

(65) Prior Publication Data

US 2024/0146738 A1 May 2, 2024

(51) Int. Cl.
*H04L 9/40* (2022.01)
(52) U.S. Cl.
CPC .......... *H04L 63/104* (2013.01); *H04L 63/102* (2013.01)
(58) Field of Classification Search
None
See application file for complete search history.

(56) References Cited

U.S. PATENT DOCUMENTS

| | | | |
|---|---|---|---|
| 9,876,803 B2 | 1/2018 | Miu et al. | |
| 9,965,609 B2 | 5/2018 | Chandra | |
| 10,321,318 B2 | 6/2019 | Raleigh | |
| 10,856,148 B2 | 12/2020 | Li et al. | |
| 11,055,391 B2 | 7/2021 | Bouse | |
| 2013/0346424 A1 | 12/2013 | Zhang et al. | |
| 2020/0050793 A1 | 2/2020 | Roundtree | |
| 2020/0053547 A1 | 2/2020 | Baek et al. | |
| 2021/0019422 A1 | 1/2021 | Zan et al. | |
| 2021/0067518 A1* | 3/2021 | Sloane | H04L 9/50 |
| 2024/0089262 A1* | 3/2024 | Legault | G06N 20/00 |

FOREIGN PATENT DOCUMENTS

| | | |
|---|---|---|
| AU | 2020201558 B2 | 7/2021 |
| WO | 2020192743 A1 | 10/2020 |

* cited by examiner

*Primary Examiner* — Brian F Shaw
(74) *Attorney, Agent, or Firm* — Banner & Witcoff, Ltd.

(57) ABSTRACT

An information-security automated process for authorizing a user request for access to a module and for identifying anomalous user authorization requests, may be implemented on a computer machine and may include the steps of receiving a user request for access to a module, generating a peer group proximity dataset, generating a user dataset, calculating a critical score, determining if the critical score is less than an enterprise threshold, and generating an approval or denial of the user request based upon the critical score. In some examples the process may include the step of executing machine learning instructions to generate a second approval or a second denial of a second user request for access to a second module. In another examples an information-security automated process for validating a user authorization access profile is disclosed herein.

20 Claims, 10 Drawing Sheets

ALERTING ON ANOMALOUS AUTHORIZATION REQUESTS DERIVED WITH PROXIMITY GRAPH

FIELD OF USE

Aspects of the disclosure relate to systems, process, and methods for the prevention of unauthorized access to resources and applications of a system or information system, including the manner of identifying, authorizing, and verifying the entity, process, or mechanism requesting access to the resource and application.

BACKGROUND

Large organization managers or entity owners typically grant or deny individual user authorization requests for access to applications or modules of the organization to reduce risk and improve cyber information-security. Sole reliance upon a manager or entity owner to review user requests is inaccurate, inefficient, and time consuming. Disclosed herein are systems, processes, and methods that leverage organizational relationships and machine learning to determine a probability divergence of a user's authorization access profile compared to the access profiles of organizational peers with authorized access to the requested application or module. The calculated access profile divergence information is used to determine an approval or denial of the user authorization request and to verify authorized user profiles by identifying anomalous profiles.

It would be advantageous to organizations to utilize systems, processes, and methods disclosed herein that may identify anomalous user authorization requests per individual user, as well as the capability to autonomously scan individual access profiles to validate the authorized profiles or to identify anomalous authorized user access profiles on a regular basis.

The present disclosure addresses one or more of the shortcomings in the industry, thus improving the operational cyber information-security of an organization's computer network by improving user authorization request and verification systems by offering improved system approvals and validation scans, and autonomous operations aided by machine learning.

SUMMARY

In light of the foregoing background, the following presents a simplified summary of the present disclosure in order to provide a basic understanding of various aspects of the disclosure. This summary is not limiting with respect to the exemplary aspects of the inventions described herein and is not an extensive overview of the disclosure. It is not intended to identify key or critical elements of the disclosure or to delineate the scope of the disclosure. Instead, as would be understood by a personal of ordinary skill in the art, the following summary merely presents some concepts of the disclosure in a simplified form as a prelude to the more detailed description provided below.

In one general aspect of this disclosure, a system of one or more computer executable software and data, computer machines and components thereof, networks, and/or network equipment can be configured to perform particular operations or actions individually, collectively, or in a distributed manner to cause the system or components thereof to perform user authorization request approvals and to perform validation scanning of user authorization profiles.

In one aspect of the disclosure, an information-security automated process for authorizing requests by a user to access a module or application from an authorization request tool may be implemented on a computer machine and the process may include the steps of receiving a user request for access to a module or application, generating a peer group dataset, generating a user dataset for the user request, calculating a critical score for the user request, determining if the critical score for the user request is less than an enterprise threshold, and generating an approval of the user request for access to the module or application if the critical score for the user request is less than an enterprise threshold, or generating a denial of the user request if the critical score for the user request is more than an enterprise threshold. In some examples, the user and the peer group may share a common nodal proximity relationship. In other examples, the critical score may be calculated utilizing a normalized peer/user Inverse Document Frequency analysis method that may include the peer group data set. In certain examples, the peer group data set may include approved access to modules and applications, and corresponding user roles related to the approved access to modules and applications. In another example, the enterprise threshold may include an anomalous critical score that is indicative of an acceptable risk of the approval of the user request.

In another aspect of the disclosure, the information-security automated process for authorizing requests by a user to a module or application from an authorization request tool may further include the step of executing machine learning instructions using the peer group dataset, the user dataset, the critical score, the determination if the critical score for the user request is less than the enterprise threshold, and the approval or denial of the user request to generate a second approval or a second denial of a second user request. In some examples, the machine learning instructions may include supervised machine learning instructions. In another example, the supervised machine learning instructions may include pattern recognition of stored data. In yet another example, the machine learning instructions may include semi-supervised machine learning instructions.

In another aspect of the disclosure, an information-security automated process for validating a user authorization access profile from an authorization validation tool may be implemented on a computer machine and the process may include the steps of initiating a user authorization access profile verification scan, selecting a user authorization access profile, generating a peer group authorization access profile for the selected user profile, calculating a peer probability distribution and a user probability distribution, and calculating a normalized divergence value using the peer probability distribution and the user probability distribution, determining if the normalized divergence value is less than an enterprise threshold, generating a validated user profile if the normalized divergence value is less than the enterprise threshold or generating an invalidated user profile if the normalized divergence value is more than the enterprise threshold, and storing the validated or invalidated user profile and related data.

In some examples, the selected user profile and the peer group profile may share a common nodal proximity relationship. In yet other examples, the peer probability distribution calculation may exclude the selected user profile. In other examples, the divergence value may be calculated utilizing a Jensen Shannon Divergence (JSD) analysis method that may include the user profile and the peer group profile. In certain examples, the user profile and the peer group profile may include approved access to modules and applications, and corresponding user roles related to the approved access to modules and applications. In another example, the enterprise threshold may include an anomalous divergence value or score that is indicative of an acceptable risk of the validation of the user profile.

In another aspect of the disclosure, the information-security automated process for validating a user authorization access profile from the authorization validation tool may further include the step of executing machine learning instructions using the user profile, the peer group profile, the peer probability distribution, the normalized divergence value, the enterprise threshold, and the validated or invalidated user profile to generate a second validated or invalidated user profile of a second user authorization access profile verification scan. In some examples, the machine learning instructions may include supervised machine learning instructions. In another example, the supervised machine learning instructions may include pattern recognition of stored data. In yet another example, the machine learning instructions may include semi-supervised machine learning instructions.

In yet another aspect of the disclosure, an information-security automated process for authorizing requests by a user to access a module or application from an authorization request tool may be implemented on a computer machine and the process may include the steps of receiving a first user request for access to a first module or application, generating a peer group dataset, generating a user dataset for the first user request, calculating a critical score for the first user request, determining if the critical score for the first user request is less than an enterprise threshold, and generating an approval of the first user request for access to the first module or application if the critical score for the first user request is less than an enterprise threshold, or generating a denial of the first user request if the critical score for the first user request is more than an enterprise threshold. In another example, the information-security automated process for authorizing requests by a user to access a module or application from an authorization request tool may further include the step of executing machine learning instructions using the peer group dataset, the user dataset, the critical score, the determination if the critical score for the first user request is less than the enterprise threshold, and the first approval or denial of the first user request to generate a second approval or a second denial of a second user request. In some examples, the machine learning instructions may include supervised machine learning instructions.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. In addition, it is to be understood that the phraseology and terminology used herein are for the purpose of description and should not be regarded as limiting. Rather, the phrases and terms used herein are to be given their broadest interpretation and meaning.

By way of introduction, aspects discussed herein relate to information-security processes for automatically authorizing user requests to organizational applications or modules. The terms application, module, and program may be used interchangeable herein. In large organizations, user access to modules is typically granted on an individual basis and typically approved by the user's manager, supervisor, or entity owner. The processes, systems, and methods disclosed herein leverages known organizational relationships between users, a user peer group, and other organizational relationships to autonomously approve user authorization requests and to validate authorized user profiles. In some examples, the processes, systems, and methods disclosed herein may utilize machine learning to train the systems to operate autonomously to approve authorization requests and to validate authorized user profiles independently—and more accurately—than entity owners.

Figure 1:
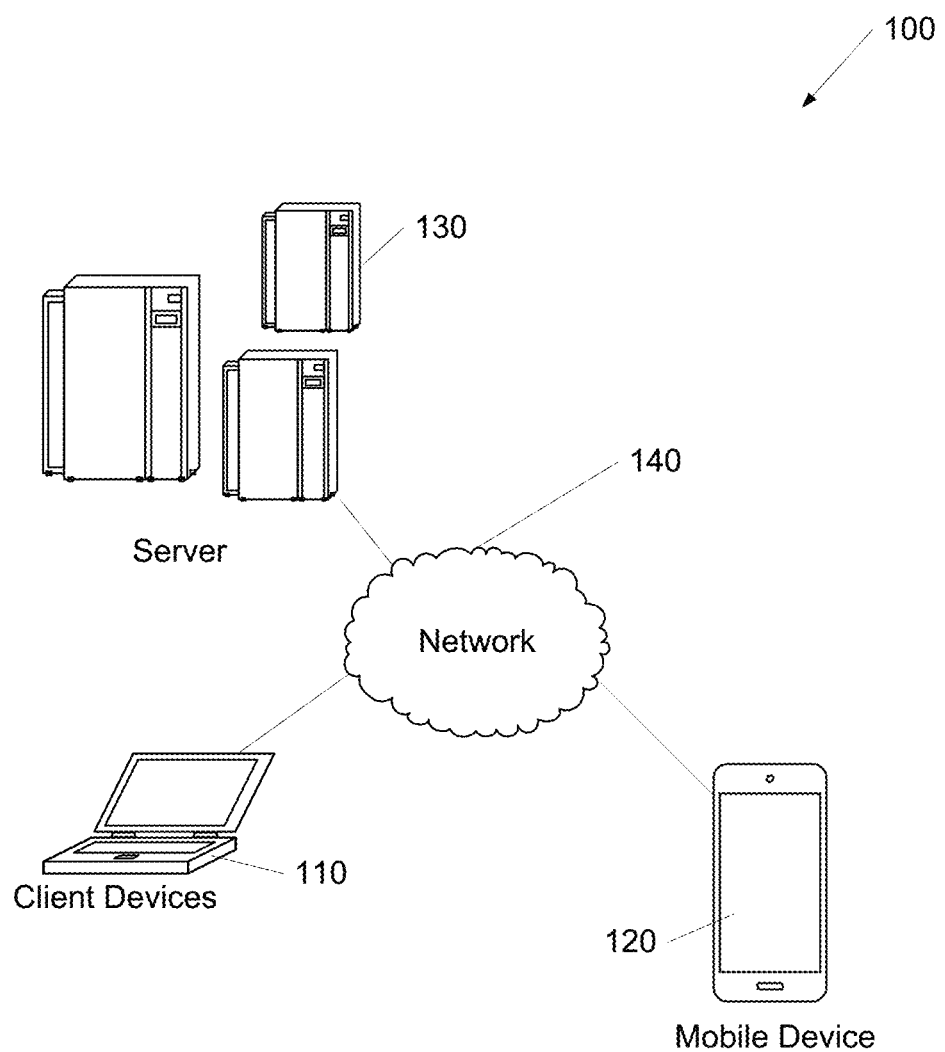
FIG. 1 illustrates an organization operating environment that may include a user authorization request and validation system in which one or more aspects described herein may be implemented.

FIG. 1 illustrates an operating environment 100 in accordance with an embodiment of the disclosure. Operating environment 100 may include at least one client device or computer machine 110, may include a mobile device 120, and/or may include at least server system 130 in communication via a network 140. Client device 110 may provide user authorization requests to server system 130 as described herein. Server system 130 may receive input to process user authorization requests and to process autonomous validation of user profiles as described herein. Network 140 may include a local area network (LAN), a wide area network (WAN), a wireless telecommunications network, and/or any other communication network or combinations thereof. It will be appreciated that the network connections shown are illustrative and any means of establishing a communications link between the computers may be used. The existence of any of various network protocols such as TCP/IP, Ethernet, FTP, HTTP and the like, and of various wireless communication technologies such as GSM, CDMA, WiFi, and LTE, is presumed, and the various computer machines described herein may be configured to communicate using any of these network protocols or technologies.

As used throughout this disclosure, computer-executable "software and data" can include one or more: algorithms, applications, databases, datasets (e.g., historical datasets), drivers, data structures, firmware, graphical user interfaces, instructions, machine learning (i.e., supervised, semi-supervised, reinforcement, and unsupervised), middleware, modules (i.e., machine learning module, normalized Inverse Document Frequency (IDF) analysis module, Jensen Shannon Divergence (JSD) analysis module), objects, operating systems, processes, programs, scripts, tools, and utilities. The computer-executable software and data is stored in tangible, non-volatile, computer-readable memory (locally or in network-attached storage) and can operate autonomously, on-demand, on a schedule, and/or spontaneously. "Computer machines" can include one or more: general-purpose or special-purpose network-accessible client device, personal computers, desktop computers, laptop or notebook computers, distributed systems, workstations, portable electronic devices, printers, scanners, facsimile machines, multifunction devices, and/or servers having one or more microprocessors for executing or accessing the computer-executable software and data. Computer machines also includes all hardware and components typically contained therein. The "servers" can be virtual or physical, on-premise or remote, and can include one or more: application servers, cybersecurity servers, test servers, and/or web servers for executing, accessing, and/or storing the computer-executable software and data. Computer "networks" can include one or more local area networks (LANs), wide area networks (WANs), the Internet, wireless networks, digital subscriber line (DSL) networks, frame relay networks, asynchronous transfer mode (ATM) networks, virtual private networks (VPN), or any combination of any of the same. Networks also include associated "network equipment" such as access points, ethernet adaptors (physical and wireless), firewalls, hubs, modems, routers, and/or switches located inside the network and/or on its periphery, as well as software executing on any of the foregoing. Any of the devices and systems described herein may be implemented, in whole or in part, using one or more computer machines or computing machines described with respect to FIG. 2.

Some or all of the data described herein may be stored using any of a variety of data storage mechanisms, such as databases. These databases may include, but are not limited to relational databases, hierarchical databases, distributed databases, in-memory databases, flat file databases, XML databases, NoSQL databases, graph databases, and/or combinations thereof. The data transferred to and from various computer machines in operating environment 100 may include secure and sensitive data, such as confidential documents, customer personally identifiable information, and account data. It may be desirable to protect transmissions of such data using secure network protocols and encryption and/or to protect the integrity of the data when stored on the various computer machines. For example, a file-based integration scheme or a service-based integration scheme may be utilized for transmitting data between the various computer machines. Data may be transmitted using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In many embodiments, one or more web services may be implemented within the various computer machines. Web services may be accessed by authorized external devices and users to support input, extraction, and manipulation of data between the various computer machines in operating environment 100. Web services built to support a personalized display system may be cross-domain and/or cross-platform, and may be built for enterprise use. Data may be transmitted using the Secure Sockets Layer (SSL) or Transport Layer Security (TLS) protocol to provide secure connections between the computer machines. Web services may be implemented using the WS-Security standard, providing for secure SOAP messages using XML encryption. Specialized hardware may be used to provide secure web services. For example, secure network appliances may include built-in features such as hardware-accelerated SSL and HTTPS, WS-Security, and/or firewalls. Such specialized hardware may be installed and configured in the operating environment 100 in front of one or more computer machines such that any external devices may communicate directly with the specialized hardware.

Figure 2:
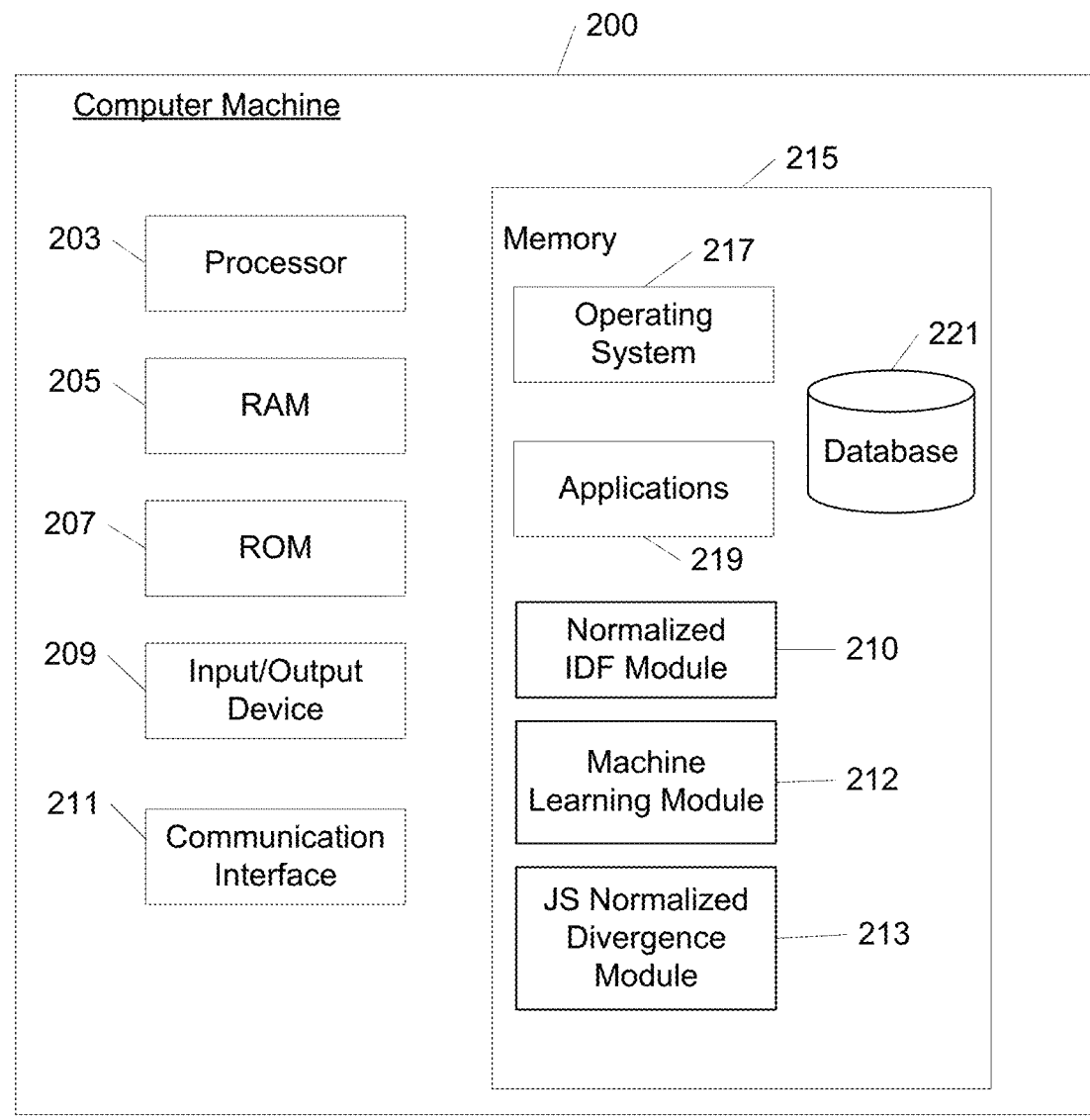
FIG. 2 illustrates an example computer machine in accordance with one or more aspects described herein.

Turning now to FIG. 2, computer machine 200 in accordance with an embodiment of the disclosure is illustrated. Computer machine 200 may include a processor 203 for controlling overall operation of the computer machine 200 and its associated components, including RAM 205, ROM 207, input/output device 209, communication interface 211, and/or memory 215. A data bus may interconnect processor(s) 203, RAM 205, ROM 207, memory 215, I/O device 209, and/or communication interface 211. In some embodiments, computer machine 200 may represent, be incorporated in, and/or include various devices such as a desktop computer, a computer server, a mobile device, such as a laptop computer, a tablet computer, a smart phone, any other types of mobile computer machines, and the like, and/or any other type of data processing device.

Input/output (I/O) device 209 may include a microphone, keypad, touch screen, and/or stylus through which a user of the computer machine 200 may provide input, and may also include one or more of a speaker for providing audio output and a video display device for providing textual, audiovisual, and/or graphical output. Communication interface 211 may include one or more transceivers, digital signal processors, and/or additional circuitry and software for communicating via any network, wired or wireless, using any protocol as described herein. Software may be stored within memory 215 to provide instructions to processor 203 allowing computer machine 200 to perform various actions. For example, memory 215 may store software used by the computer machine 200, such as an operating system 217, application programs or modules 219, and/or an associated internal database 221. In some examples, memory 215 may include normalized (IDF) module 223, machine learning module 225, and/or JS normalized divergence module 227. The various hardware memory units in memory 215 may include volatile and nonvolatile, removable and non-removable media implemented in any method or technology for storage of information such as computer-readable instructions, data structures, program modules, or other data. Memory 215 may include one or more physical persistent memory devices and/or one or more non-persistent memory devices. Memory 215 may include, but is not limited to, random access memory (RAM) 205, read only memory (ROM) 207, electronically erasable programmable read only memory (EEPROM), flash memory or other memory technology, optical disk storage, magnetic cassettes, magnetic tape, magnetic disk storage or other magnetic storage devices, or any other medium that may be used to store the desired information and that may be accessed by processor 203.

Processor 203 may include a single central processing unit (CPU), which may be a single-core or multi-core processor, or may include multiple CPUs. Processor(s) 203 and associated components may allow the computer machine 200 to execute a series of computer-readable instructions to perform some or all of the processes described herein. Although not shown in FIG. 2, various elements within memory 215 or other components in computer machine 200, may include one or more caches, for example, CPU caches used by the processor 203, page caches used by the operating system 217, disk caches of a hard drive, and/or database caches used to cache content from database 221. For embodiments including a CPU cache, the CPU cache may be used by one or more processors 203 to reduce memory latency and access time. A processor 203 may retrieve data from or write data to the CPU cache rather than reading/writing to memory 215, which may improve the speed of these operations. In some examples, a database cache may be created in which certain data from a database 221 is cached in a separate smaller database in a memory separate from the database, such as in RAM 205 or on a separate computing device. For instance, in a multi-tiered application, a database cache on an application server may reduce data retrieval and data manipulation time by not needing to communicate over a network with a back-end database server. These types of caches and others may be included in various embodiments, and may provide potential advantages in certain implementations of devices, systems, and methods described herein, such as faster response times and less dependence on network conditions when transmitting and receiving data.

Although various components of computing machine 200 are described separately, functionality of the various components may be combined and/or performed by a single component and/or multiple computer machines in communication without departing from the invention.

Figure 3:
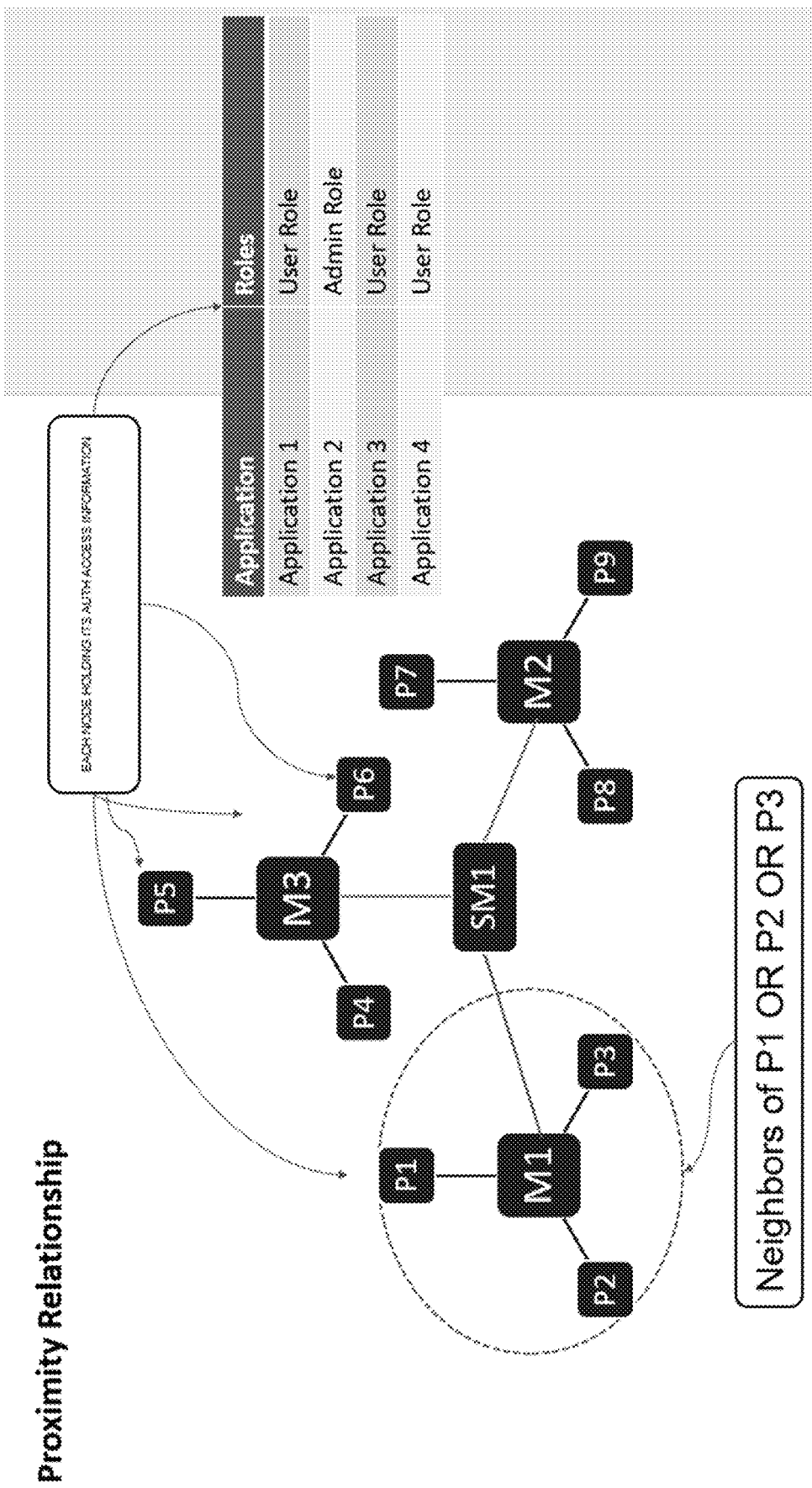
FIG. 3 illustrates example conceptual proximity relationship graphical nodes between users and administrators of an organizational operating environment according to one or more aspects of the disclosure.

FIG. 3 illustrates a conceptual example of proximity relationship nodes between users and administrators of an operating environment according to one or more aspects of the disclosure. In a large organization, a nodal proximity relationship may include peers or persons P, a manager M, and a senior manager SM1. Peers may be groups of individuals reporting the same manager. The peers may have similar functions and responsibilities within the organization, and may require access to the same modules to perform their responsibilities. As shown in FIG. 3, a proximity relationship may comprise a graph (i.e., node(s)), for example, including peers P1, P2, P3, and manager M1. Each node may be connected by its manager to a senior manager. For example, manager M1 may be connected to senior manager SM1, and senior manager SM1 may be connected to managers M2 and M3 and their respective nodes comprising peers P7, P8, P9, and P4, P5, P6 respectively. Notably, each node may include its own authorized access information that may include the authorized applications (i.e., applications 1, 2, 3, 4, etc.) as well as the corresponding role(s) assigned to the user.

As previously discussed, large organizations rely upon individual managers and/or entity owners to grant individual users access to modules on an individual basis. By analyzing and determining a proximity relationship between the peers and managers which leverages organizational relationships, a probability divergence of the user's authorization profile compared to that of their organizational peers may be calculated. The calculated profile divergence may be used to determine whether or not an authorization request to a module is anomalous or not, and the user request may be subsequently approved or denied. Such a system and process provides the ability to trigger an identification of an anomalous authorization request per individual user, as well as the ability to scan individual users on regular basis to identify anomalous access profiles to streamline and improve an organization's cyber information-security protocols and related access. Moreover, machine learning algorithms may be executed to train the disclosed system and method to conduct autonomous operations as disclosed herein.

Figure 4:
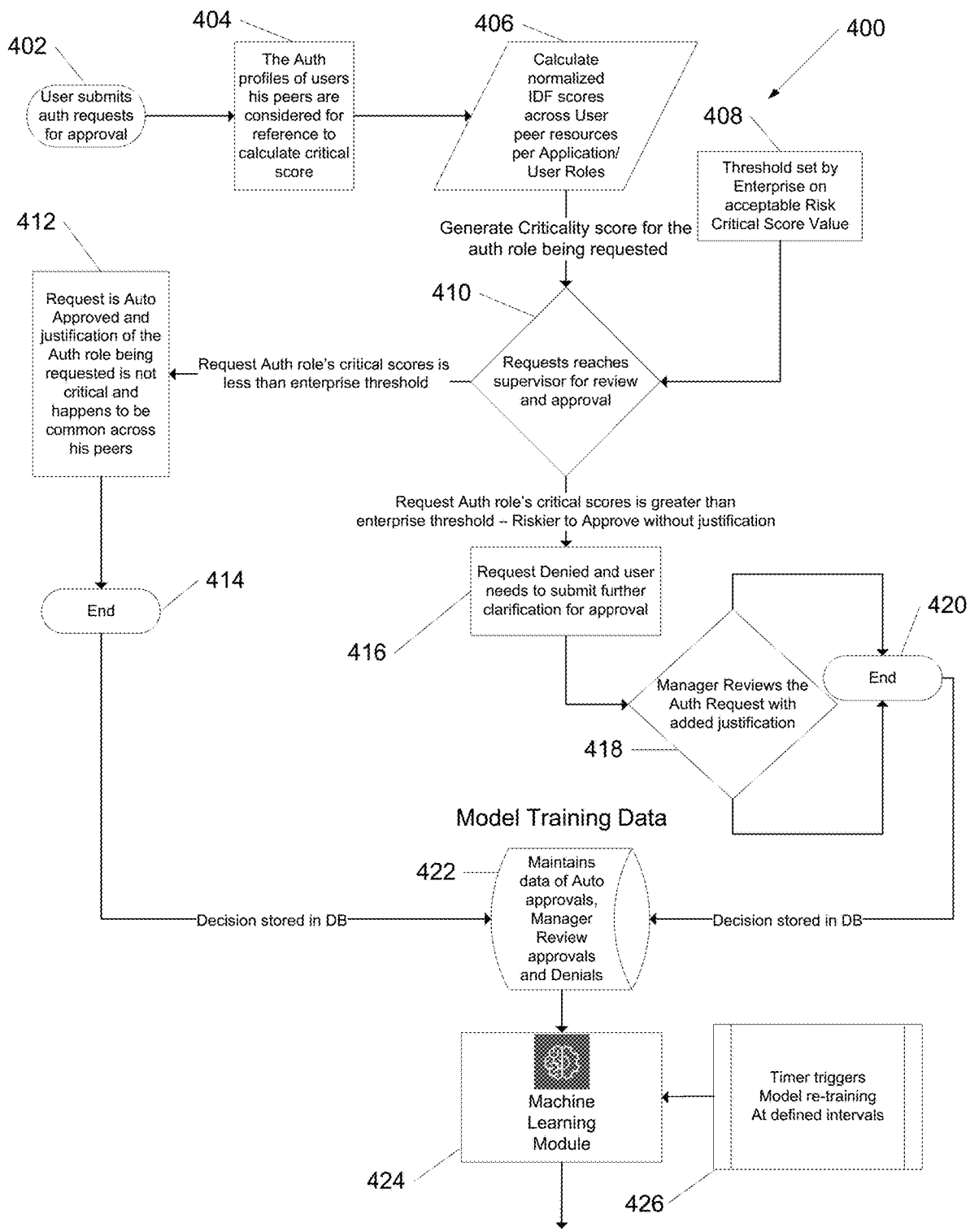
FIG. 4 depicts a flow chart for approving or denying a user authorization request according to one or more aspects of the disclosure.

FIG. 4 depicts a flow chart for approving or denying a user authorization request according to one or more aspects of the disclosure. Some or all of the steps of process 400 may be performed using any of the computer machines and/or combinations thereof described herein. In a variety of embodiments, some or all of the steps described below may be combined and/or divided into sub-steps as appropriate.

At step 402, an information-security automated process for authorizing a user request to a module receives a user submission for access approval. The user request may be submitted via the user's client device, or alternatively, the user's mobile device.

At step 404, the computing machine processor identifies and generates a proximity relationship node (i.e., graph) using the user's profile. The user profile may contain authorized applications and roles, as well as job or position related information (e.g., division, section, title, responsibilities, etc.). From the proximity relationship node, peers of the user are identified. Similarly, the peer profiles may include authorized applications and roles, as well as job or position related information (e.g., division, section, title, responsibilities, etc.). A peer profile probability distribution may be calculated across members of the proximity node indicating the distribution of access to modules and related roles across the peer group. For instance, in Example 1 below, each bar may be indicative of the probability of a user having access to an application (i.e., number of users in the peer group having access to the module divided by number of users in the peer group). From this peer profile probability distribution, a peer group data set may be generated.

Figure 8:
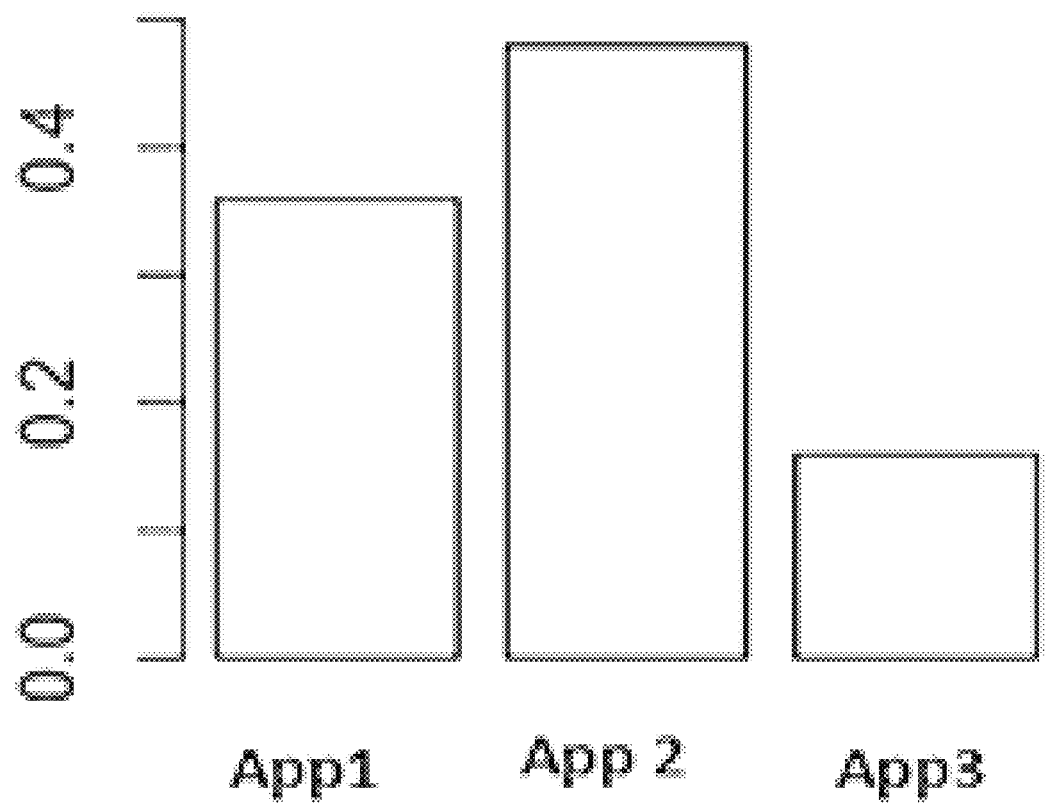
FIG. 8 depicts the probability distribution of access to modules among peer users according to one or more aspects of the disclosure.

Example 1 (FIG. 8). Probability Distribution of Access to Modules Among Peer Users At step 406, a critical score is generated using calculated normalized scores across user peer resources and per user roles. The computing machine may use the normalized IDF module to calculate normalized scores using the peer group dataset to generate a critical score for the authorization module and role requested by a user. The normalized IDF (Inverse Document Frequency) analysis disclosed herein is a novel and unique modification to normalized IDF analysis. IDF is an analytical process that uses the frequency of words to determine how relevant those words are to a given document, and may be used to quantify the importance or relevance of string representations such as words or phrases in a particular document within a collection of documents (i.e., corpus). A normalized IDF is determined by the number of times a particular term is used relative to the document. Inverse Document Frequency analyzes at how common (or uncommon) a word is within the corpus. In sum, the importance of a term is inversely related to its frequency across documents. IDF may provide information on how often a term appears in a document and IDF may provide information about the relative rarity of a term in the corpus.

As shown in Table 2 below, it is observed that App5 (i.e., module) has higher critical score than App1, App2, App3, and App4 since it appears less frequently amongst different documents (i.e., user Apps and related roles). The more times a term appears (i.e., an App) its critical score starts decreasing. Using this analogy, the more times an App and related role appears across many user profiles, it is less critical as many users have access to the module. Contrary, to App5, App2 appears across all four user profiles and has the lowest corresponding critical score as shown below in Table 2.

TABLE 2

User Profile(s) and Normalized IDF.

| User | Roles |
|---|---|
| User 1 | App1, App2, App3, App4 |
| User 2 | App1, App2, App3 |
| User 3 | App1, App2, App4 |
| User 4 | App2, App5 |

| No. | App | Term count Doc 1 | Doc 2 | Doc 3 | Doc 4 | Doc count | IDF | Normalized IDF or Critical Scores |
|---|---|---|---|---|---|---|---|---|
| 1 | App1 | 1 | 1 | 1 | 0 | 3 | Log(4/4) + 1 = 1 | 1/5.45408 = 0.183 |
| 2 | App2 | 1 | 1 | 1 | 1 | 4 | Log(4/5) + 1 = 0.90308 | 0.90308/5.45408 = 0.165 |
| 3 | App3 | 1 | 1 | 0 | 0 | 2 | Log(4/3) + 1 = 1.125 | 1.125/5.45408 = 0.252 |
| 4 | App4 | 1 | 0 | 1 | 0 | 2 | Log(4/3) + 1 = 1.125 | 1.125/4.45408 = 0.252 |
| 5 | App5 | 0 | 0 | 0 | 1 | 1 | Log(4/2) + 1= 1.301 | 1.301/4.45408 = 0.292 |
| | | | | | | Total 5.45408 | | |

By multiplying the two values, a final normalized IDF value may be calculated (i.e., critical score). The higher the critical score the more important or relevant the term. As a term gets less relevant, its critical score will approach 0.

In the present disclosure, terms or words are essentially substituted by applications (i.e., modules) and the related user permissions. The peer group data from the proximity node may form the corpus. Accordingly, the normalized IDF module may generate a critical score for the user role requested. The normalized IDF module may assign lower scores for approved access to modules appearing across all peers versus assigning higher scores for modules which only a few peers may have been authorized to access. If all the users in the generated peer group have access to the module, then the critical score indicator for the application is low as a majority of a user's peers have access to the requested module. Alternatively, if all the users in the generated peer group do not have access to the module, then the critical score indicator for the application is high as a majority of a user's peers do not have access to the requested module.

In essence, the IDF is a measure of how much information the word provides, i.e., if it is common or rare across all documents. It is the logarithmically scaled inverse fraction of the documents that contain the word (obtained by dividing the total number of documents by the number of documents containing the term, and then taking the logarithm of that quotient). Normalized IFD or critical score may be defined and calculated using the following equation:

$$\log\left(\frac{N}{1+n_t}\right) + 1$$

where N total number of documents in the corpus, and number of documents where the term t appears.

At step 408, the manager, supervisor, or senior manager may establish an enterprise threshold to identify critical scores that may be considered anomalous. The organization designated manager or supervisor may set an enterprise threshold to identify what critical score may be considered anomalous. In some examples, the enterprise threshold is determined by management, historical data, or in view of increased information-security concerns.

At step 410, the user request and related data calculated to determine a critical score is transmitted to the supervisor or manager for review and approval. At step 412, if the requested critical score is less than the enterprise threshold, the user request is automatically approved as the module and user role being requested is not anomalous since the module and user role is determined to be common across the peer group. If the enterprise threshold is set to 0.50, for example, a user requesting access to APP1 having a critical threshold that is 0.40, then the request is not considered anomalous and the user request may be automatically approved at step 412. User requests to access a module that everyone on the team (i.e., within the designated proximity relationship node) has access to results in low critical scores and encourages managers to approve such requests automatically without further investigation or justification.

At step 416, the user request is denied in view of what is determined to be an anomalous request in view of the critical score and enterprise threshold. In Example 2 below, the enterprise threshold is set at 0.20. User requests access to APP1 with a critical score of 0.375, greater than the enterprise threshold of 0.20, would be designated as anomalous and would require further supervisor or manager justification or clarification before approving the user request.

Figure 9:
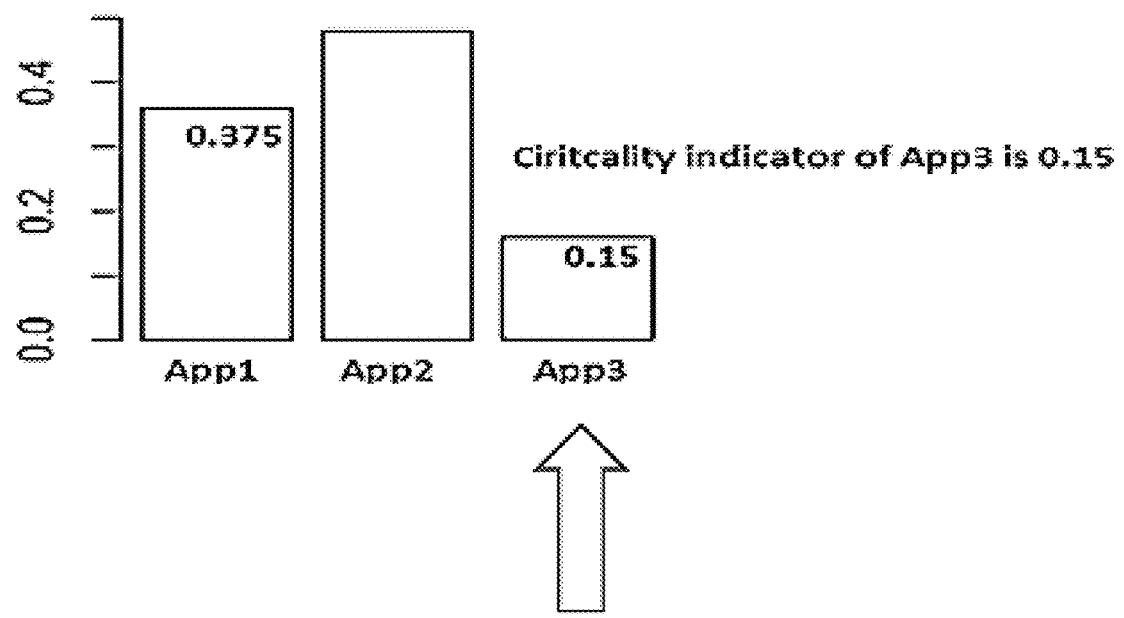
FIG. 9 depicts a critical score that is less than an enterprise threshold according to one or more aspects of the disclosure.

Example 2 (FIG. 9). Critical Score is Less than an Enterprise Threshold

At step 418, the manager manually reviews the user request after additional information or justification related to the user request is provided and the user request is ultimately approved or denied by the manager. At steps 414 and 420, the user authorization access process is completed.

At step 422, the decision to approve or deny the request, as well as the data related to the request, such as the peer group dataset, the user dataset, the critical score, the determination if the critical score for the user request is less than the enterprise threshold, and the approval or denial of the user request, and other pertinent data generated, calculated, or received in the process, such as manager corrections or added justification or information, may be stored on the computing machine. In other examples, the information may be stored on the server or other database.

At step 424, the collected data from step 422 may be transmitted to a machine learning module.

At step 426, a timer may trigger machine model re-training at defined intervals. Alternatively, machine model re-training may be triggered randomly.

Figure 5:
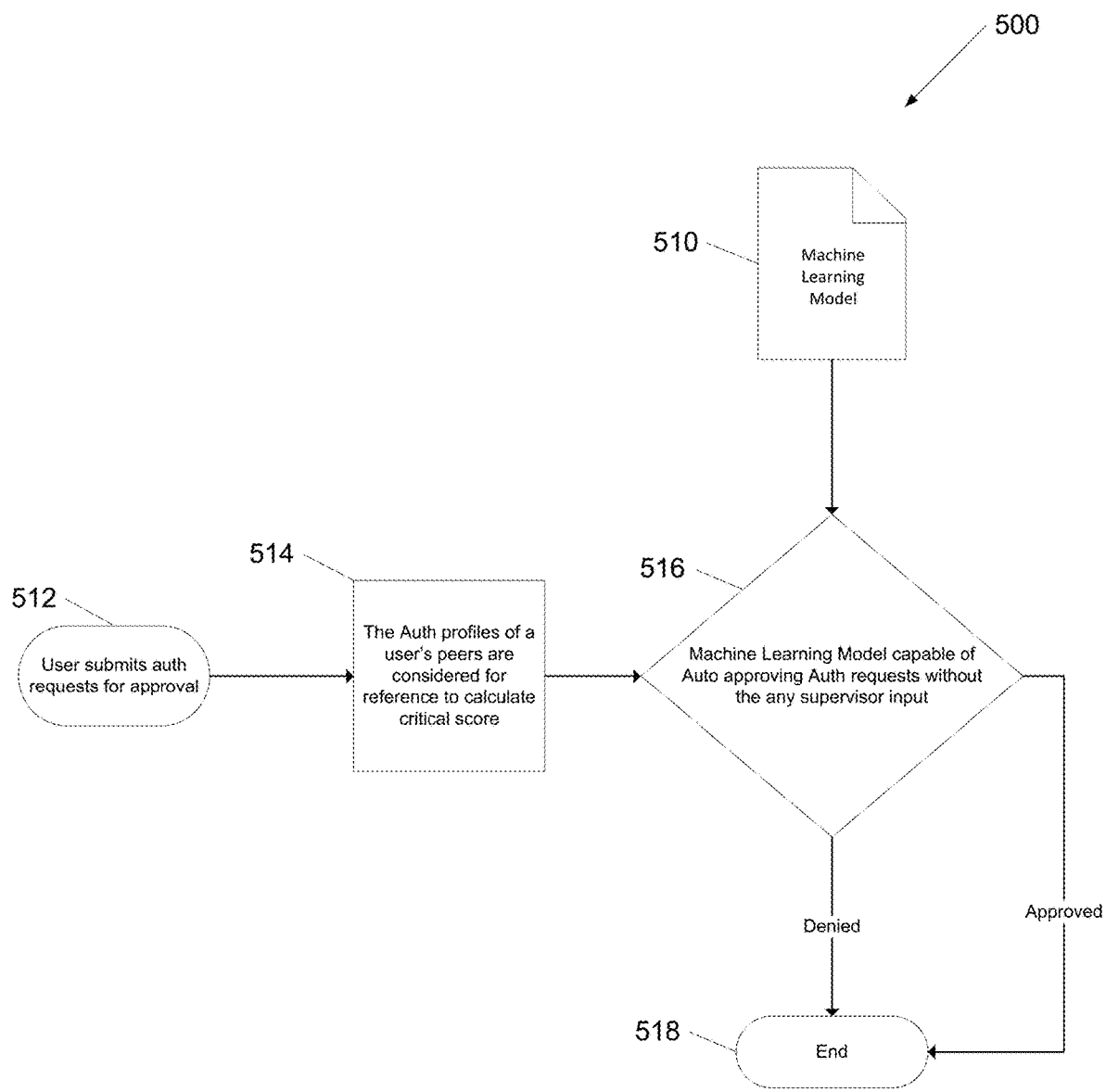
FIG. 5 depicts a flow chart for an example machine learning algorithm for training a user authorization request system in accordance with one or more aspects described herein.

FIG. 5 depicts a flow chart for an example machine learning algorithm for training a user authorization request system and process according to one or more aspects of the disclosure. Some or all of the steps of process 500 may be performed using the server and network described herein. In other examples, some or all of the steps of process 500 may be performed using any of the other computer machines and/or combinations thereof described herein. In a variety of embodiments, some or all of the steps described below may be combined and/or divided into sub-steps as appropriate.

At step 510, the collected data from process 400 may be transmitted to the machine learning model.

Machine Learning as used in this disclosure generally refers to automating and improving the learning process of computers based on their experiences or historical datasets without being actually programmed i.e., without any human assistance. The process starts with inputting good quality data and then training the machines or algorithms by building machine learning models using the data and different algorithms.

Machine learning implementations as used herein are classified into three major categories, depending on the nature of the learning signal or response available to a learning system. The first is supervised learning. This machine learning algorithm consists of a target or outcome or dependent variable which is predicted from a given set of predictor or independent variables. Using these datasets of variables, a function is generated that maps input variables to desired output variables. The training process continues until the model achieves a desired level of accuracy on the training data. Examples of supervised learning include: Regression, Decision Tree, Random Forest, KNN, Logistic Regression, etc.

The second is unsupervised learning. In this machine learning algorithm, there is no target or outcome or dependent variable to predict or estimate. It is used for clustering a given data set into different groups. Apriori algorithm and K-means are some of the examples of Unsupervised Learning.

The third is semi-supervised or reinforcement learning. Using this algorithm, the machine is trained to make specific decisions. Here, the algorithm trains itself continually by using trial and error methods and feedback methods. This machine learns from past experiences and tries to capture the best possible knowledge to make accurate decisions. Markov Decision Process is an example of semi-supervised machine learning.

Machine learning can also be used to recognize patterns in the peer group data and user profiles (not shown) in order to identify anomalous user requests and anomalous authorized user profiles.

At step 512, a user submits an authorization request to a module for approval.

At step 514, authorization profiles of a user's peers are referenced to calculate a critical score. As discussed in steps 404 and 406 of process 400, the computing machine processor may identify and generate a proximity relationship node using the user profile. From the proximity relationship node, peers of the user are identified and peer profiles may be generated. As previously discussed, the peer profile probability distribution may be calculated across members of the proximity node indicating the distribution of access to modules and related roles across the peer group. A peer profile probability distribution may be generated from the peer dataset to calculate the critical score.

At step 516, computer software on the computer machine uses a machine learning algorithm on the collected and stored data from process 400 and input from step 514 to approve or deny user authorization requests without any supervisor input. The data from step 514 may be used by the algorithm, as well as the data from step 510 to include prior decisions to approve or deny prior user requests, as well as the related data to include the peer group dataset, the user dataset, the critical score, the determination if the critical score for the user request was less than the enterprise threshold, and other pertinent data, such as manager corrections, added justification, or additional information, etc. Based upon the stored information from the database(s), the machine learning algorithm is capable of approving user authorization requests without any manager or supervisor input. It is preferable that a supervised machine learning algorithm be used on the data to authorize user requests. In some examples, the supervised model training data featured inputs may include a user's team, the users' peer authorization profile(s), manager or supervisor justifications, and normalized IDF scores. As previously discussed, the target output for the model is a final decision of approval or a denial of the user request.

At step 518, the machine learning algorithm denies or approves the user request and the inquiry is ended. In some examples, an anomaly report may be generated for a supervisor or manager to review. After verifying the anomaly report, the machine learning model may be re-trained. In some examples, the machine learning model may be trained to recognize patterns for learning that may include false positives and/or true positives.

Figure 6:
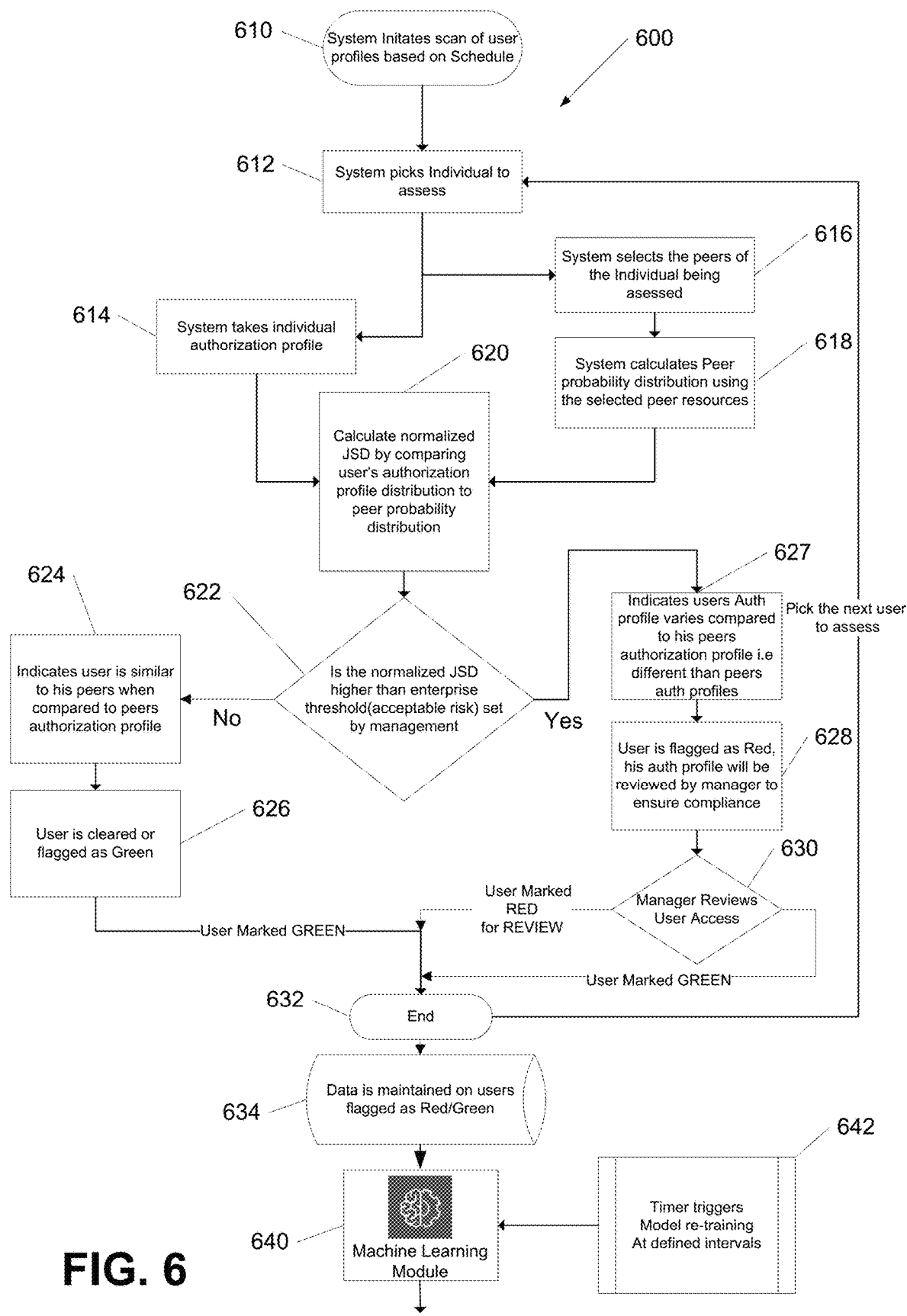
FIG. 6 depicts a flow chart for an autonomous system initiated validation scan of user access profiles according to one or more aspects of the disclosure.

FIG. 6 depicts a flow chart for an autonomous system initiated validation scan of user access authorization profiles according to one or more aspects of the disclosure. Some or all of the steps of process 600 may be performed using the server described herein. In other examples, some or all of the steps of process 600 may be performed using any of the other computer machines and/or combinations thereof described herein. In a variety of embodiments, some or all of the steps described below may be combined and/or divided into sub-steps as appropriate.

At step 610, an autonomous system validation scan of user profiles is initiated. In some examples, the validation scan may be initiated according to a schedule. In other examples, the validation scan may be initiated at random intervals. In some examples, the validation scan may be initiated by a supervisor or manager.

At step 612, the system selects an individual to assess. In some examples, the individual is selected randomly. In other examples, the individual is selected randomly from a proximity node, and the proximity node may be selected by a supervisor or manager.

At step 614, the computing machine processor retrieves the selected individual's user profile. As previously discussed, the user profile may contain authorized applications and roles, as well as job or position related information (e.g., division, section, title, responsibilities, etc.).

At step 616, the computing machine processor identifies and may generate a proximity relationship node based upon the user's profile. From the proximity relationship node, peers of the user may be identified and peer profiles may be generated. As discussed above, the peer profiles may include authorized applications and roles, as well as job or position related information (e.g., division, section, title, responsibilities, etc.).

At step 618, a peer profile probability distribution may be calculated across members of the proximity node indicating the distribution of access to modules and related roles across the peer group. Importantly, the generated peer profile does not include the selected individual's information or data from the selected individual's user profile.

At step 620, the peer profile and the user profile may be compared against each other. The greater the differences between the peer probability distribution compared to the person of interest's user profile probability distribution may indicate that the selected user profile may require verification as it is anomalous. A variation of the Jensen-Shannon Divergence (JSD) may be used to calculate and compare the user profile probability distribution and the peer profile probability distribution. JSD measures the similarity between two distributions. Said differently, the JSD analysis measures the amount of divergence between the two distributions. In the present disclosure, the two distributions include the user profile probability distribution and the peer profile probability distribution. The JSD analysis is a symmetrized and smoothed version of the Kullback-Liebler Divergence, or $D(P,Q)$. The JSD of the two distributions, $P$ and $Q$, may be defined by the following equation:

$$JSD(P\|Q) = \tfrac{1}{2} D(P\|M) + \tfrac{1}{2} D(Q\|M)$$

where $P$ and $Q$ are the two probability distributions to be compared;

$JSD(P//Q)$ is the Jensen-Shannon divergence of $P$ and $Q$;

$M = \tfrac{1}{2}(P+Q)$, where $M$ is the average probability distribution of $P$ and $Q$. $M$ is used as a reference distribution to which the Kullback-Leibler divergence of distribution $P$ and distribution $Q$ are calculated;

$D(D//M)$ is the Kullback-Leibler divergence distance between distribution $P$ and distribution $M$;

$D(Q//M)$ is the Kullback-Leibler divergence distance between distribution $Q$ and distribution $M$;

The JSD metric bounds are $0 \leq JSD(P//Q) \leq 1$.

Again, in the present disclosure the probability distribution is calculated by comparing the user profile probability distribution with the peer probability distribution. When the corresponding probability is 0, a value of 0.001 may be assigned to avoid errors, assuming that less than 0.1 percent of users have access to a particular module.

For instance, in Example 3 below, each bar may be indicative of the probability of a user having access to an application (i.e., number of users in the peer group having access to the module divided by number of users in the peer group). From this peer profile probability distribution, a peer group data set may be generated. As shown in Example 3 below, the further apart the distributions, the higher the divergence value. Thus, users are identified in the validation scan by their divergence values whose user authorization profiles are different than their respective peers. In example 3, more than 50% of the peers have access to App1 and all peers have access to App2. Depending upon a threshold established by a manager or supervisor, it may be anomalous that the person of interest also has access to App3. And it is likely anomalous that the person of interest also has access to App4.

Figure 10:
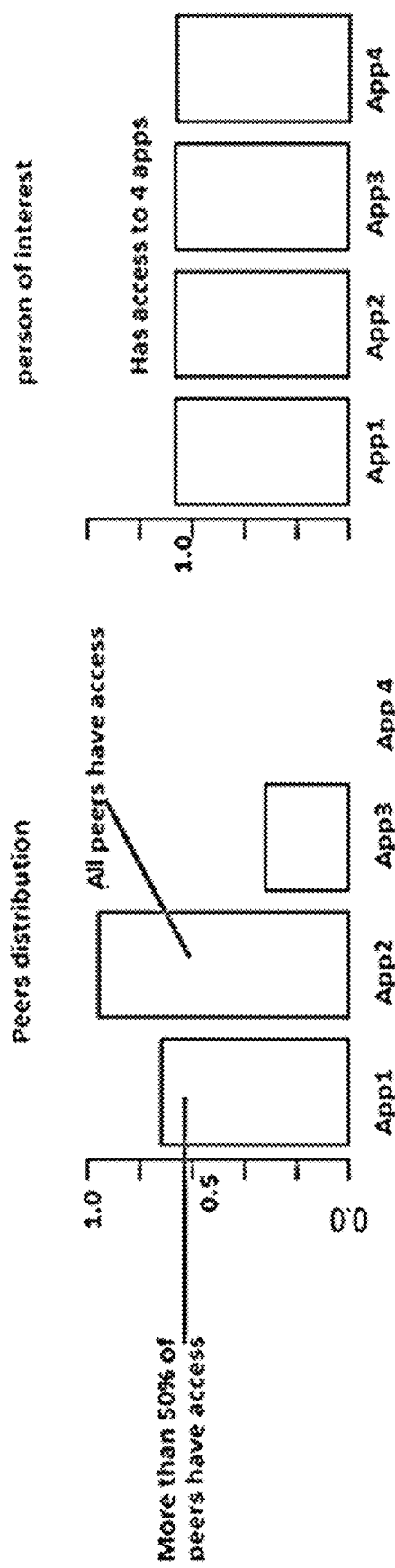
FIG. 10 depicts peer profile and user profile probability distributions according to one or more aspects of the disclosure.

Example 3 (FIG. 10). Peer Profile and User Profile Probability Distributions As shown in Table 1 below, for example, it is observed that App5 (i.e., module) has a higher critical score than the other applications since App5 appears less frequently among the different documents (i.e., peer profiles). The more times a term (i.e., App) is present, the related critical score starts dropping. Using the example from Table 1, the more times an App appears in many user profiles, access to the App is less critical since many users have authorized access to the App and related roles.

TABLE 1

Peer Profile and User Profile Probability Distributions.

| User | Roles |
|---|---|
| User 1 | App1, App2, App3, App4 |
| User 2 | App1, App2, App3 |
| User 3 | App1, App2, App4 |
| User 4 | App2, App5 |

| No. | Token | Term count Doc 1 | Doc 2 | Doc 3 | Doc 4 | Doc count | IDF | Normalized IDF or Critical Scores |
|---|---|---|---|---|---|---|---|---|
| 1 | app1 | 0.25 | 0.333333333 | 0.333333333 | 0 | 3 | 0.2 | 0.142450142 |
| 2 | app2 | 0.25 | 0.333333333 | 0.333333333 | 0.5 | 4 | 0 | 0 |
| 3 | app3 | 0.25 | 0.333333333 | 0 | 0 | 2 | 0.301 | 0.214387464 |
| 4 | app4 | 0.25 | 0 | 0.333333333 | 0 | 2 | 0.301 | 0.214387464 |
| 5 | app5 | 0 | 0 | 0 | 0.5 | 1 | 0.602 | 0.428774929 |
| | | | | | | Total | 1.404 | |

At step 622, the divergence value is compared to the enterprise threshold. As previously discussed, the manager or supervisor may establish an enterprise threshold to identify acceptable risk. The organization designated approver or supervisor may set an enterprise threshold to identify what divergence value or score may be considered anomalous. In some examples, the enterprise threshold is determined by management, historical data, or in view of increased information-security concerns.

At step 624, it is determined that the divergence value is less than the enterprise threshold and the selected user profile is similar to the peer profile.

At step 626, the validation scan is completed and cleared.

At step 627, it is determined that the divergence value is more than the enterprise threshold and the selected user authorization profile is considered anomalous in view of the peer profiles.

At step 628, the scanned user authorization profile is flagged as anomalous requiring a manager or supervisor to conduct a review of the user profile to ensure compliance.

At step 630, the manager or supervisor conducts a review of the user authorization profile. The manager may mark the user profile as needing further review/requiring additional information or as passing the validation process and clearing the review.

At step 632, the validation and user profile assessment is completed.

At step 634, the data from the completed autonomous system initiated validation scan of the user authorization profile is stored on the computing machine. In other examples, the data may be stored on the server or other database.

At step 640, the collected data from step 634 may be transmitted to a machine learning module. At step 642, a timer may trigger machine model re-training at defined intervals. Alternatively, machine model re-training may be triggered randomly. In other examples, a supervisor or manager may initiate re-training.

Figure 7:
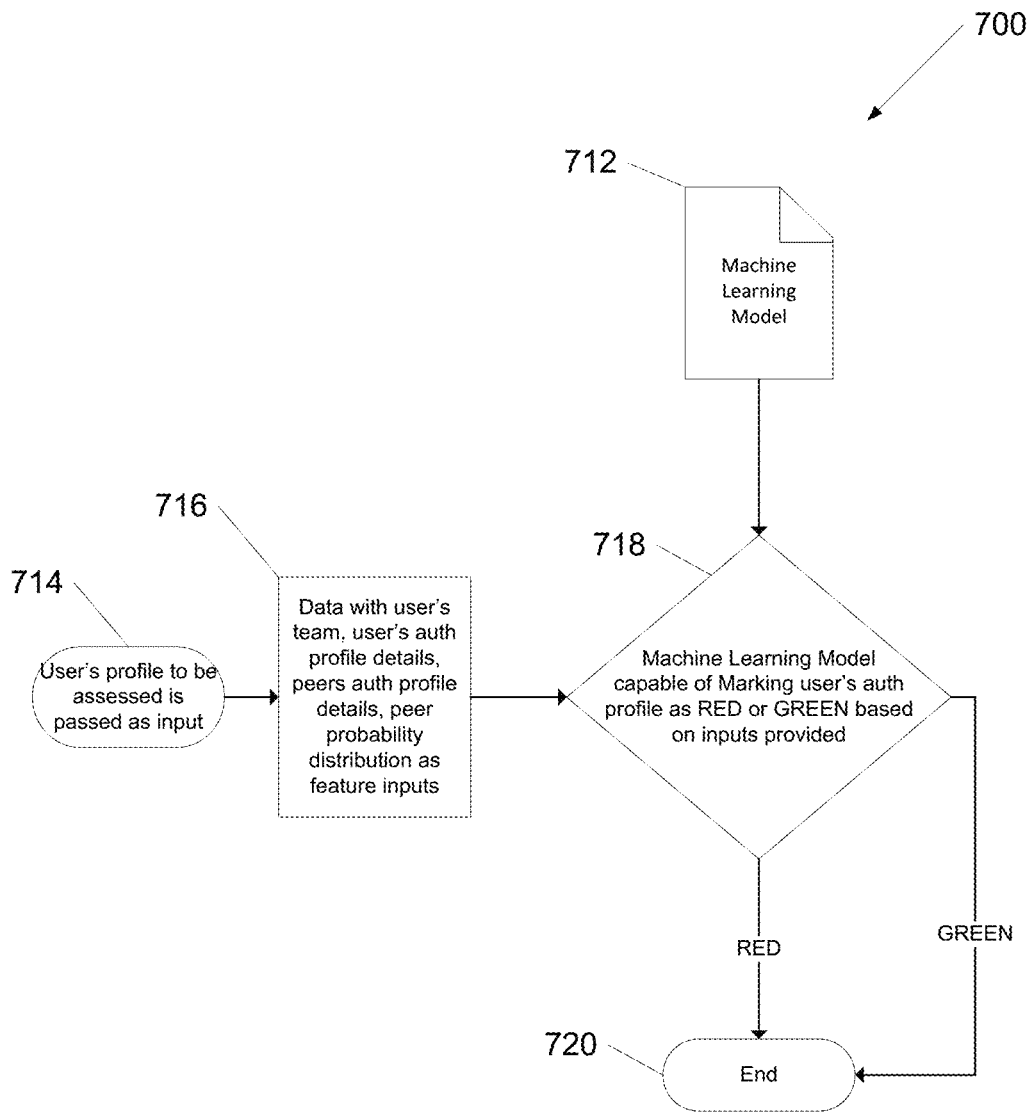
FIG. 7 depicts a flow chart for an example machine learning algorithm for training a system to conduct autonomous system initiated validation scans of user access profiles in accordance with one or more aspects described herein.

FIG. 7 depicts a flow chart for an example machine learning algorithm 700 for training a user authorization request system according to one or more aspects of the disclosure. Some or all of the steps of process 700 may be performed using the server and network described herein. In other examples, some or all of the steps of process 700 may be performed using any of the other computer machines and/or combinations thereof described herein. In a variety of embodiments, some or all of the steps described below may be combined and/or divided into sub-steps as appropriate.

At step 712, the collected data from process 600 may be transmitted to a machine learning model.

At step 714, a user authorization profile is identified and selected as requiring validation. In some examples, user profile validation scans may be initiated according to a schedule. In another example, the user profile validation scans may be initiated at random intervals. In other examples, a supervisor or manager may initiate a validation scan.

At step 716, the machine learning model may receive data comprising the user profile information, authorization profiles of the user's peers, peer and user probability distributions, etc. As discussed in steps 614, 616, 618, and 620 of process 600, the computing machine processor may identify and generate a proximity relationship node based upon the user profile. From the proximity relationship node, peers of the user may be identified and peer profiles may be generated. As previously discussed, the peer profile probability distribution may be calculated across members of the proximity node indicating the distribution of access to modules and related roles across the peer group. A divergence value may be calculated using the peer group profile and the user profile.

At step 718, computer software on the computer machine uses a machine learning algorithm on the collected and stored data from process 600 and input from step 716 to approve or deny user authorization requests without any supervisor input. The data from step 714 may be used by the algorithm, as well as the data from step 712 to include prior decisions to validate or invalidate prior user profiles, as well related data to include the peer group profile, the user profile, the divergence value, and other pertinent data, such as manager corrections, added justification, or additional information, etc. Based upon the stored information from the database(s), the machine learning algorithm is capable of validating user authorization profiles without any manager or supervisor input. It is preferable that a supervised machine learning algorithm be used on the data to authorize user requests.

At step 720, the machine learning algorithm is completed with a user profile validated as green or flagged as invalidated (i.e., anomalous) and red. Flagged invalidated profiles may be verified by managers or supervisors. In some examples, an anomaly report may be generated for a supervisor or manager to review. After verifying the anomaly report, the machine learning model may be re-trained. In some examples, the machine learning model may be trained to recognize patterns for learning that may include false positives and/or true positives.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, and the like that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid-state memory, RAM, and the like. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a system, and/or a computer program product.

Although the present invention has been described in certain specific aspects, many additional modifications and variations would be apparent to those skilled in the art. In particular, any of the various processes described above may be performed in alternative sequences and/or in parallel (on different computer machines) in order to achieve similar results in a manner that is more appropriate to the requirements of a specific application. It is therefore to be understood that the present invention may be practiced otherwise than specifically described without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. An information-security automated process for authorizing requests by a user to a module from an authorization request tool, the process implemented on a computer machine with a processor that executes computer-executable instructions stored on a computer-readable medium, the module, the authorization request tool, and the computer machine coupled together over a computer network, the process comprising the steps of:

receiving, by the computer machine from the authorization request tool, a user request for access to the module;

storing, by the processor into a first sector of the computer-readable medium, the user request;

generating, by the processor, a peer group dataset;

storing, by the processor into a second sector of the computer-readable medium, the peer group data set for the user request;

generating, by the processor, a user dataset for the user request;

loading, from the computer-readable medium by the processor into a third sector of the computer-readable medium, the user dataset for the user request;

calculating, by the processor, a critical score for the user request;

loading, from the computer-readable medium by the processor into a fourth sector of the computer-readable medium, the critical score for the user request;

determining, by the processor, if the critical score for the user request is less than an enterprise threshold;

generating, by the processor, an approval of the user request for access to the module if the critical score for the user request is less than an enterprise threshold; or generating, by the processor, a denial of the user request if the critical score for the user request is more than an enterprise threshold;

transmitting, by the processor, the approval or the denial of the user request; and storing, by the computer machine from the authorization request tool, the approval or the denial of the user request for access to the module.

2. The information-security automated process of claim 1, wherein the user and the peer group share a common nodal proximity relationship.

3. The information-security automated process of claim 2, wherein the critical score is calculated utilizing a normalized peer Inverse Document Frequency (IDF) analysis method comprising the peer group data set.

4. The information-security automated process of claim 3, wherein the user data set and the peer group data set comprise approved access to modules and corresponding user roles to the approved access to modules.

5. The information-security automated process of claim 4, wherein the enterprise threshold comprises an anomalous critical score, and wherein the anomalous critical score is indicative of an acceptable risk of the approval of the user request.

6. The information-security automated process of claim 5, further comprising the step of:

executing, by the processor, machine learning instructions using the peer group dataset, the user dataset, the critical score, the determination if the critical score for the user request is less than the enterprise threshold, and the approval or denial of the user request to generate a second approval or a second denial of a second user request.

7. The information-security automated process of claim 6, wherein the machine learning instructions comprise supervised machine learning.

8. The information-security automated process of claim 7, wherein the supervised machine learning instructions comprise pattern recognition of stored data.

9. The information-security automated process of claim 6, wherein the machine learning instructions comprise semi-supervised machine learning.

10. An information-security automated process for validating a user authorization access profile from an authorization validation tool, the process implemented on a computer machine with a processor that executes computer-executable instructions stored on a computer-readable medium, the user authorization profile, the authorization validation tool, and the computer machine coupled together over a computer network, the process comprising the steps of:

initiating, by the computer machine from authorization validation tool, a user authorization access profile verification scan;

selecting, by the processor, a user authorization access profile;

loading, from the computer-readable medium by the processor into a first sector of the computer-readable medium, the user profile;

generating, by the processor, a peer group profile for the selected user profile;

loading, from the computer-readable medium by the processor into a second sector of the computer-readable medium, the peer group profile;

calculating, by the processor, a peer probability distribution;

loading, from the computer-readable medium by the processor into a third sector of the computer-readable medium, the peer probability distribution;

calculating, by the processor, a user profile probability distribution;

loading, from the computer-readable medium by the processor into a fourth sector of the computer-readable medium, the user probability distribution;

calculating, by the processor, a normalized divergence value using the peer probability distribution and the user probability distribution;

loading, from the computer-readable medium by the processor into a fifth sector of the computer-readable medium, the normalized divergence value;

determining, by the processor, if the normalized divergence value is less than an enterprise threshold;

generating, by the processor, a validated user profile if the normalized divergence value is less than the enterprise threshold; or generating, by the processor, an invalidated user profile if the normalized divergence value is more than the enterprise threshold;

transmitting, by the processor, the validated or invalidated user profile; and storing, by the processor, the validated or invalidated user profile.

11. The information-security automated process of claim 10, wherein the selected user profile and the generated peer group profile share a common nodal proximity relationship.

12. The information-security automated process of claim 11, wherein the peer probability distribution calculation excludes the selected user profile.

13. The information-security automated process of claim 12, wherein the normalized divergence value is calculated utilizing a Jensen Shannon Divergence (JSD) analysis method comprising the user profile and the peer group profile.

14. The information-security automated process of claim 13, wherein enterprise threshold is determined by a manager of the common nodal proximity relationship.

15. The information-security automated process of claim 14, further comprising the step of:
  executing, by the processor, machine learning instructions using the user profile, the peer group profile, the peer probability distribution, the normalized divergence value, the enterprise threshold, and the validated or invalidated user profile to generate a second validated or invalidated user profile of a second user authorization access profile verification scan.

16. The information-security automated process of claim 15, wherein the machine learning instructions comprise supervised machine learning.

17. The information-security automated process of claim 16, wherein the supervised machine learning instructions comprise pattern recognition of stored data.

18. The information-security automated process of claim 10, wherein the machine learning instructions comprise semi-supervised machine learning.

19. An information-security automated process for authorizing requests by a user to a module from an authorization request tool, the process implemented on a computer machine with a processor that executes computer-executable instructions stored on a computer-readable medium, the module, the authorization request tool, and the computer machine coupled together over a computer network, the process comprising the steps of:
  receiving, by the computer machine from the authorization request tool, a first user request for access to a first module;
  storing, by the processor into a first sector of the computer-readable medium, the first user request;
  generating, by the processor, a peer group dataset for the first user request;
  loading, from the computer-readable medium by the processor into a second sector of the computer-readable medium, the peer group dataset for the first user request;
  generating, by the processor, a user dataset for the first user request;
  loading, from the computer-readable medium by the processor into a third sector of the computer-readable medium, the user dataset for the first user request;
  calculating, by the processor, a critical score for the first user request;
  loading, from the computer-readable medium by the processor into a fourth sector of the computer-readable medium, the critical score for the first user request;
  determining, by the processor, if the critical score for the first user request is less than an enterprise threshold;
  generating, by the processor, an approval of the first user request if the critical score for the first user request is less than an enterprise threshold; or
  generating, by the processor, a denial of the first user request if the critical score for the first user request is more than an enterprise threshold;
  storing, by the processor into a sixth sector of the computer-readable medium, the approval or the denial of the first user request; and
  executing, by the processor, machine learning instructions using the peer group dataset, the user dataset, the critical score, the determination if the critical score for the user request is less than the enterprise threshold, and the approval or denial of the user request to generate a second approval or a second denial of a second user request.

20. The information-security automated process of claim 19, wherein the machine learning instructions comprise supervised machine learning.

* * * * *